US006952487B2

(12) United States Patent
Patton et al.

(10) Patent No.: US 6,952,487 B2
(45) Date of Patent: Oct. 4, 2005

(54) DETECTING THE PRESENCE OF FAILURE(S) IN EXISTING MAN-MADE STRUCTURES

(75) Inventors: David L. Patton, Webster, NY (US); Gustavo R. Paz-Pujalt, Rochester, NY (US); John P. Spoonhower, Webster, NY (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 569 days.

(21) Appl. No.: 09/828,010

(22) Filed: Apr. 6, 2001

(65) Prior Publication Data

US 2002/0146150 A1 Oct. 10, 2002

(51) Int. Cl.$^7$ .................. G06K 9/00; E01C 23/02; C09K 11/06
(52) U.S. Cl. .................. 382/103; 404/107; 427/8; 252/301.19
(58) Field of Search ................. 702/134, 135; 404/107; 382/103; 427/8; 252/301.19

(56) References Cited

U.S. PATENT DOCUMENTS

| | | | | | |
|---|---|---|---|---|---|
| 4,124,990 | A | * | 11/1978 | Bell et al. ............... | 405/167 |
| 4,653,316 | A | * | 3/1987 | Fukuhara ............... | 73/146 |
| 5,042,055 | A | * | 8/1991 | Wirt et al. ............... | 378/59 |
| 5,126,654 | A | * | 6/1992 | Murphy et al. ........... | 324/71.2 |
| 5,444,241 | A | * | 8/1995 | Del Grande et al. ...... | 250/253 |
| 5,554,318 | A | | 9/1996 | Neumann et al. ....... | 252/301.19 |
| 5,656,786 | A | * | 8/1997 | Curtis et al. ............ | 73/865.8 |
| 5,657,003 | A | * | 8/1997 | Fuentes ................. | 340/690 |
| 5,774,568 | A | * | 6/1998 | Freneix ................. | 382/100 |
| 6,309,728 | B1 | * | 10/2001 | Usami et al. ............ | 428/64.1 |
| 6,535,141 | B1 | * | 3/2003 | Doherty ................. | 340/905 |
| 6,615,648 | B1 | * | 9/2003 | Ferguson et al. ........ | 73/146 |

FOREIGN PATENT DOCUMENTS

| | | | |
|---|---|---|---|
| EP | 1 193 470 | | 4/2002 |
| GB | 2 194 062 | | 2/1988 |
| JP | 06-201613 | * | 7/1994 |
| JP | 2000-249688 | * | 9/2000 |
| WO | 00/47982 | | 8/2000 |

OTHER PUBLICATIONS

DeVault, "Robotic System for Underwater Inspection of Bridge Piers," IEEE, Sep. 2000, pp. 32–37.*
"Automated Detection of Surface Defects in Machined Castings", by P. W. Woods et al., British Journal of Non Destructive Testing, British Institute of Non Destructive Testing, Northhampton, GB, vol. 31, No. 12, Dec. 1, 1989, pp. 665–670.
"Enhancement of Penetrant–Inspection Images", NTIS Tech. Notes, US Department of Commerce, Springfield, Virginia, US, Feb. 1, 1991, p. 189.
Patent Abstracts of Japan, 07 280735, Oct. 27, 1995, vol. 1996, No. 02, Feb. 29, 1996.

* cited by examiner

*Primary Examiner*—Bhavesh M. Mehta
*Assistant Examiner*—Shefali Patel
(74) *Attorney, Agent, or Firm*—RatnerPrestia

(57) ABSTRACT

A method for capturing at least one image of an existing man-made structure and for detecting the presence of failure(s) in such existing man-made structure including: providing a detectable material on the surface or in an existing man-made structure so that portions of the detectable material will be present in the failure(s) of the existing man-made structure; providing an image sensor and which captures at least one image of the existing man-made structure and identifies failure(s) due to the existence of the detectable material in the failure(s) to provide at least one digital image; and processing the captured digital image(s) to provide a visual image of the existing man-made structure to determine the presence of failure(s) in the existing man-made structure.

10 Claims, 7 Drawing Sheets

DETECTING THE PRESENCE OF FAILURE(S) IN EXISTING MAN-MADE STRUCTURES

FIELD OF THE INVENTION

The present invention relates to detecting the presence of failure(s) in existing man-made structures.

BACKGROUND OF THE INVENTION

The surveillance of ground topography is well known in the art. It is frequently the case that an aircraft or a satellite includes an image capture device such as a charge-coupled device (CCD). In ground surveillance it is highly desirable to detect whether there has been a failure in a man-made object such as a road, a pipeline, an electrical grid, or other man-made structures of practical interest. When detected, a determination is made if remedial action must be taken. Often times a visual inspection of ground topography is provided by a land-based crew that traverses an area by vehicle or foot, to determine if there is a failure. Airborne photographic systems can also be used for capturing images of adjacent areas. These images are then reviewed to determine if there is a failure.

In many cases these inspections must done by a ground site survey; individuals visit these locations and take measurements or obtain other forms of data on-sight. This process becomes cumbersome, costly, inconvenient, and in many cases unreliable and unsafe due to the dangers present in remote locations and to potential false interpretations due to worker fatigue and other factors. Furthermore, remote locations are frequently in mountains, deserts and forests that are difficult to reach and frequent inspection requires the placement of permanent maintenance and inspection crews adding to overall costs.

SUMMARY OF THE INVENTION

It is an object of the present invention to provide an improved way to determine if there is a failure in an existing man-made structure.

It is another object of the present invention to use material that can be detected by an image sensor when present in a failure of an existing man-made structure.

This object is achieved by a method for capturing at least one image of an existing man-made structure and for detecting the presence of failure(s) in such existing man-made structures comprising the steps of:

(a) providing a detectable material on the surface or in an existing man-made structure so that portions of the detectable material will be present in the failure(s) of the existing man-made structure;

(b) providing an image sensor and which captures at least one image of the existing man-made structure and identifies failure(s) due to the existence of the detectable material in the failure(s) to provide at least one digital image; and (c) processing the captured digital image(s) to provide a visual image of the existing man-made structure to determine the presence of failure(s) in the existing man-made structure.

It is an advantage of the present invention to provide a more effective way of determining failure(s) in existing man-made structures by automatically processing images captured from a remote platform. This automatic processing can include comparing with previously detected images. This automatic processing can also include algorithms and expert systems that act in a predictive manner.

A feature of the present invention is that a detection chemical or agent or a chemical change associated with a failure can be applied to an existing man-made structure of practical interest that is particularly suitable for detection after a failure occurs.

DESCRIPTION OF THE PREFERRED EMBODIMENTS

In the case where a detectable substance has to be applied to the structure an expense is occurred in applying the substance. In the case of a road the substance could be added to the road building material itself such as concrete or asphalt. A problem exists with current roads. An inexpensive delivery method is needed for the detectable substance that is to be detected. For example, if a detection chemical material or agent provides a different in contrast when there is a material failure an inexpensive delivery system can be used to apply the detection chemical material or agent. Also it can be advantageous for the detectable substance to have a short life or a degree of biodegradability. The present invention can use encapsulated dyes or phosphors. Such dyes or phosphors can be encapsulated in a polymeric or ceramic matrix for easier delivery. That is, for the substance to be present only for the time the images are to be captured.

Figure 1:
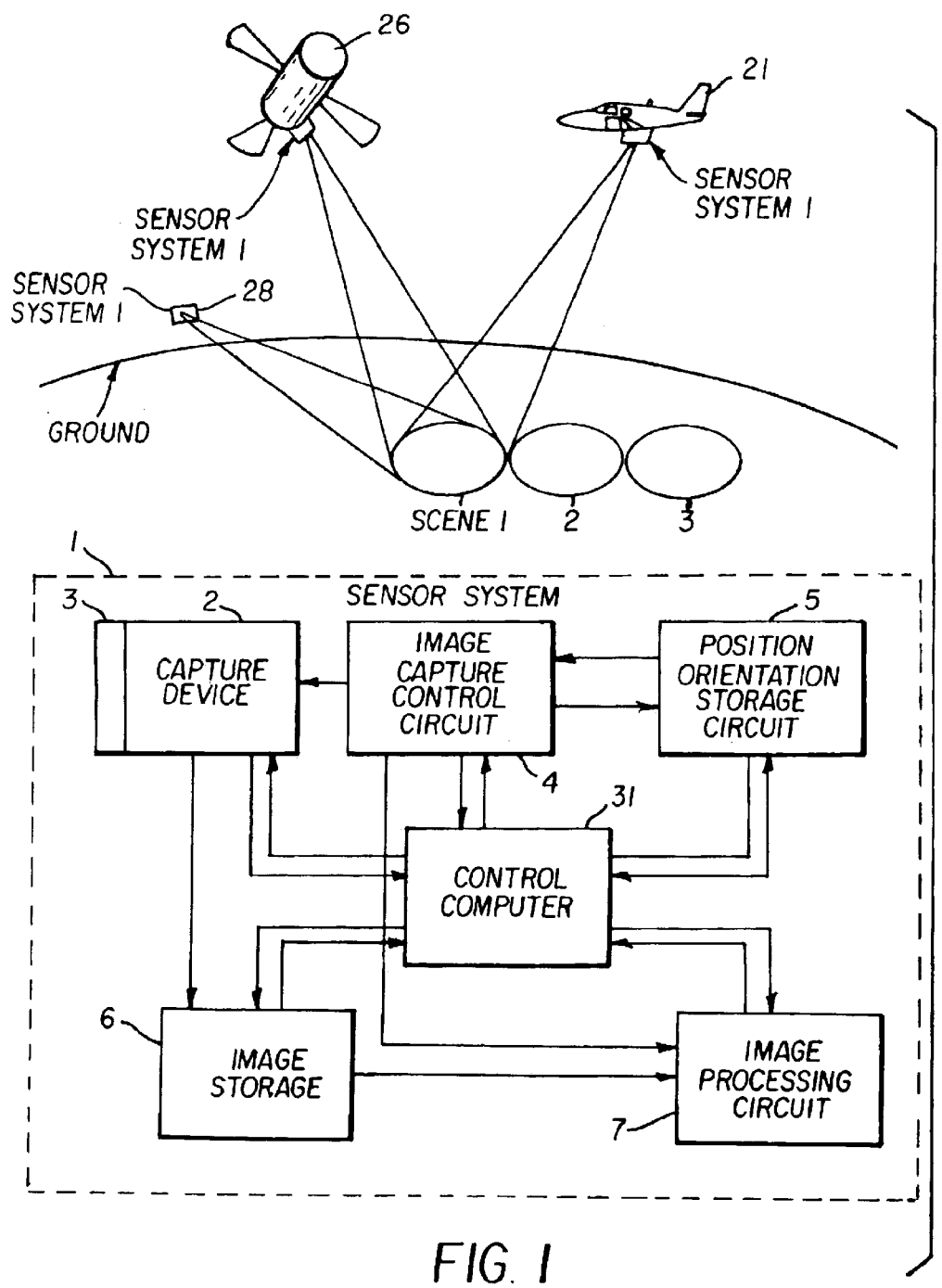
FIG. 1 depicts a system for capturing images from an airborne, a satellite or ground platform in accordance with the present invention.

Referring to FIG. 1, a sensor system 1 employed in the capturing of images in order to identify failures in existing man-made structures can be mounted on either an aerial platform 21, a satellite 26 or a ground based platform 28. Images of the ground containing various existing man-made structures such as roadways, pipelines, electrical power lines, agricultural, mining, real estate and the like are captured by this sensor system 1. Sequential images can be captured in digital form and either stored in the aerial platform 21, satellite 26 or ground based platform 28 to be transferred later, or transmitted via a radio link to a control ground station. The capture device 2 includes an electronic sensor, typically a CCD or complementary metal oxide semiconductor (CMOS) imaging array that along with some imaging optics captures a picture of the scene in electronic form. In some instances a special optical filter 3 is attached to the input to the CCD or CMOS detector to filter the light wavelengths that are incident upon the detector. This optical filter 3 is chosen so as to maximize the signal-to-noise ratio for the detection of a specific type of failure. Alternatively, the ground location image can be captured by conventional photographic cameras. Film images would then have to be converted to digital images by an image scanner that includes an image sensor. The system 1 also has an image capture control circuit 4 that sequences the operation of the capture device 2. As will be clear from FIG. 1, the operation of the various elements shown in system 1 are under the control of a control computer 31. The image capture control circuit 4 controls capture device 2 and sends position and orientation information to a position and orientation storage circuit 5 with each captured image. Position information in the form of spatial coordinates is provided in order to identify the location of the existing man-made structures of interest. Such position information is also stored in position and orientation storage circuit 5. Position and orientation data are used along with predetermined coordinate positions to locate the existing man-made structures in the captured image. Control computer 31 causes image data to be stored in image storage 6 and can be processed to identify features of a scene in image processing circuit 7. The processing sequence is also directed by control computer 31. The image processing circuit 7 includes a storage memory (not shown) that includes a representation of different failures to be detected and comparing the captured digital image with the failures to determine the presence of a failure(s), type of failure(s) and location of the failure(s). With the exception of the capture device 2, the various elements of the system 1 can be located either in the remote platform or at the ground station location. Moreover, many of the elements described can be embodied in software that can be understood to be within the control computer 31. The capture device 2 is located in either the aerial, satellite or ground based platform.

Figure 2:
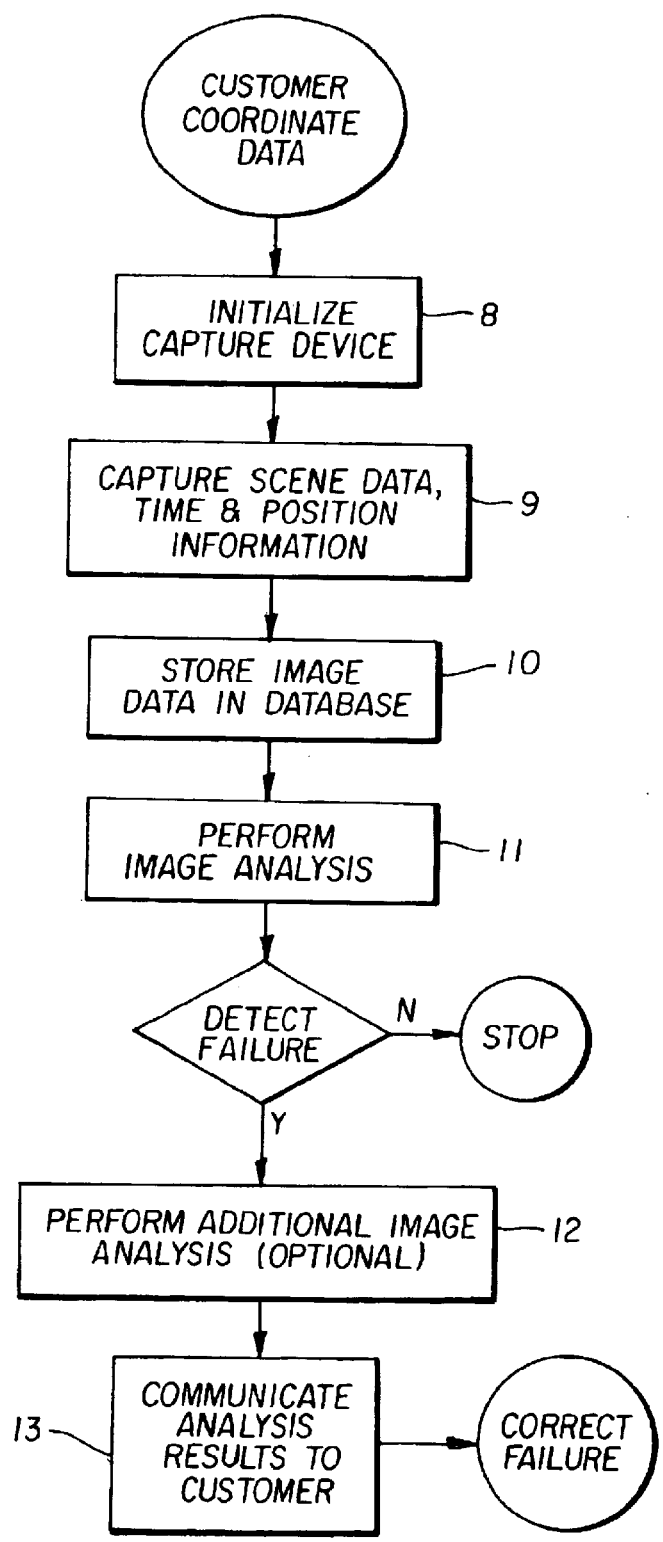
FIG. 2 is a flowchart in block diagram form of the process of capturing and processing images to detect failures in existing man-made structures.

The overall process for detecting failure(s) in existing man-made structures is depicted in flowchart form in FIG. 2. The flowchart is in block diagram form and those skilled in the art will appreciate that many of the functions are controlled by the control computer 31. The starting event includes initializing the capture device 8 and image storage 6 to erase any previously captured scene data. Next a new scene is captured in block 9 using the position information supplied by the customer to trigger recording of the images. The image data along with position and time information necessary to identify the location and time of the current scene is stored in order to facilitate comparison with the same scene taken at other times. Image and other data are stored in a scene database 10 in order to perform such comparisons at a future time. Image analysis 11 is next performed in order to identify changes in the scene and facilitate identification of failures in the existing man-made structures that appear in the scene. The latest scene image is compared with image data that has been previously stored in the scene database 10. If a failure is not detected the process stops. Detection of a failure can initiate further image analysis 12 as required. The identification process finishes with the communication of the results of the analysis 13. The communication of the results can take many forms, for example an audible or visual alarm, a telephone contact ore-mail notification of the detection of the failure. The final step in the process is to correct the failure.

Figure 3:
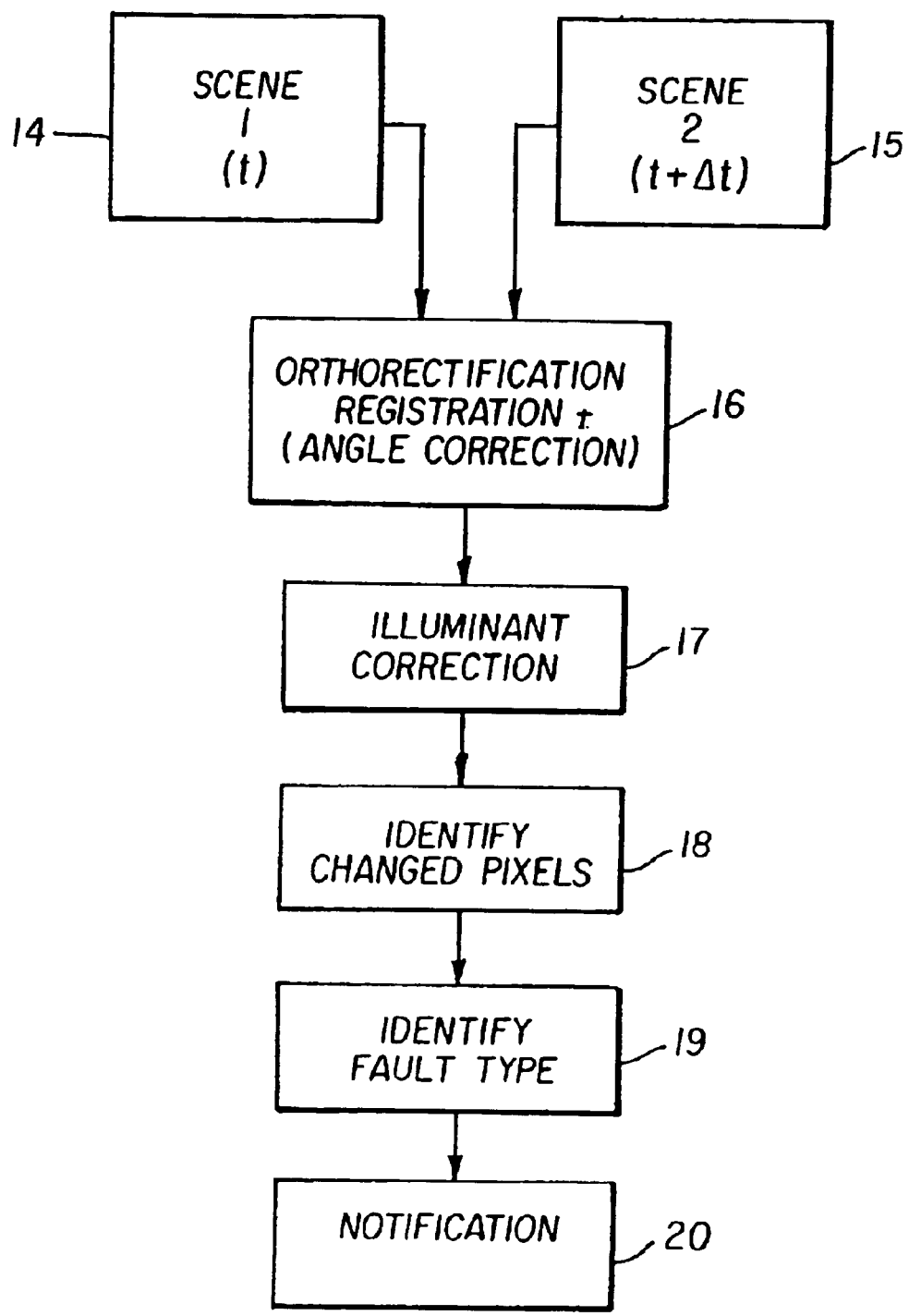
FIG. 3 is a flowchart in block diagram form of an image-processing algorithm, which can be used in the system shown in FIG. 1.

FIG. 3 depicts the algorithm used to process image data files from a database and identifies failures if they have occurred. The algorithms can embody an expert system which permits interplay with a user. Two separate data files, scene (1) 14 and scene (2) 15, are made available for comparison. Both data files contain the same scene content, but they typically record images taken at different times. That is, the time between capturing the two images differs by a time Δt. Both image files and scenes can undergo the process of orthorectification 16, that is, compensation for variations in position and angle at the time the scenes were recorded. This process is performed in order to allow an exact pixel-by-pixel comparison of the elements of a scene or image. It may or may not be necessary to correct the data in each scene for differences in the illumination 17 at the time each scene was recorded. Changes in the scene are identified in block 18 are used by the control computer 31 by detecting, using software, differences in the pixel content of the two scenes to be compared. Such changes can be reflected in the intensity of the pixels, or in the shape of an object, corresponding to a finite collection of pixels. Such methods for identification of pixel or object changes are well known to those skilled in the art. On the basis of such pixel changes the failure type is identified in block 19 and notification 20 of the existence of the failure is communicated.

Figure 4:
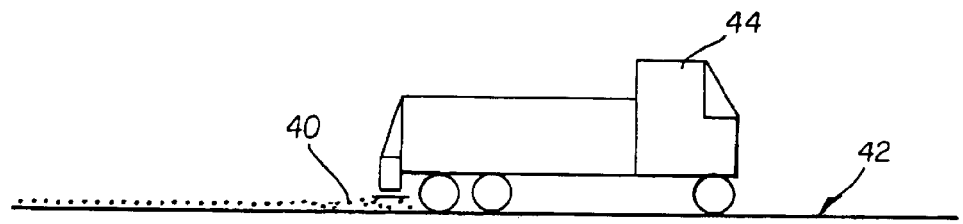
FIG. 4 illustrates a method using a truck of applying a chemical material or agent on a road to aid in detecting failures in an existing man-made object.
Figure 5:
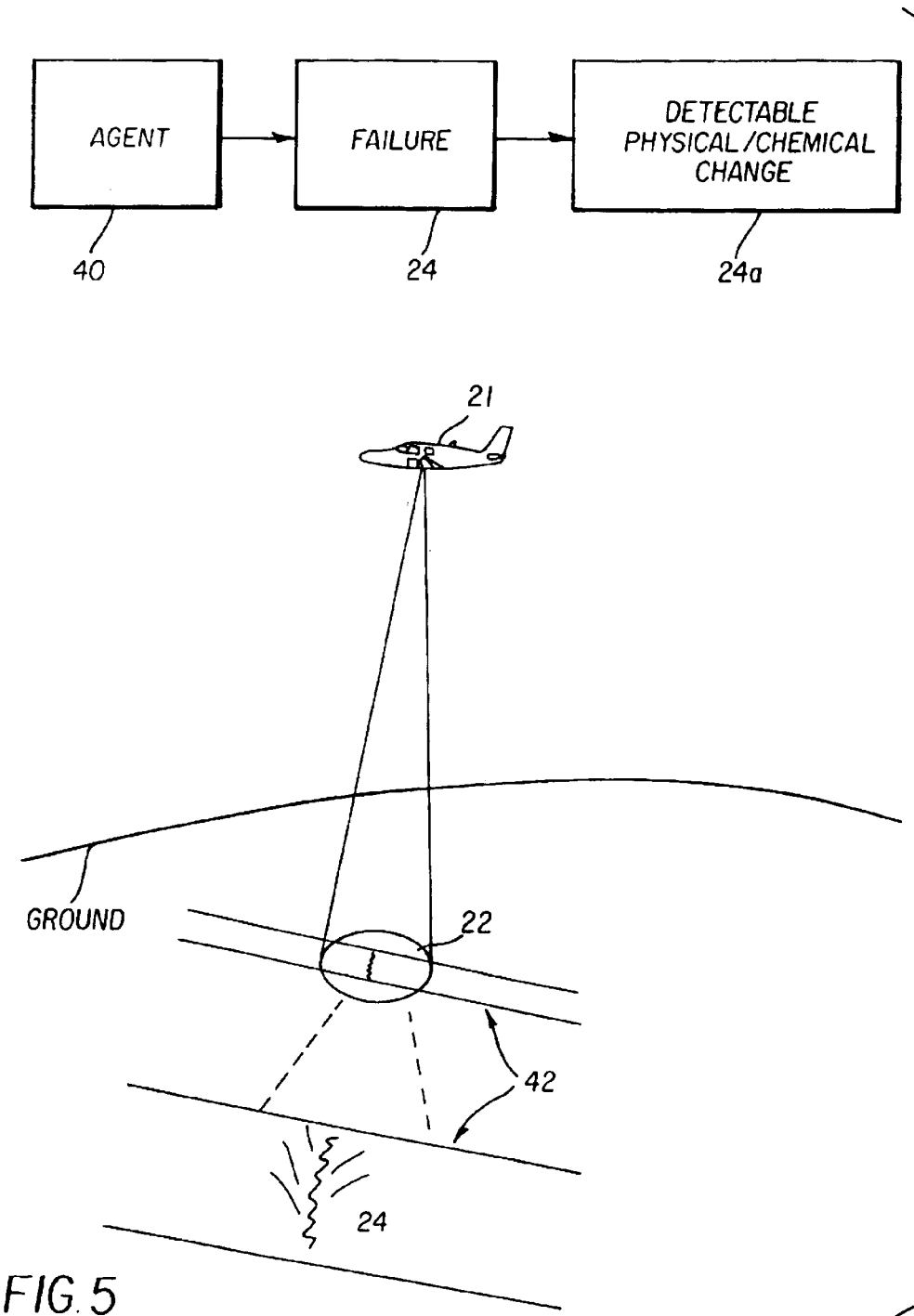
FIG. 5 illustrates another method of applying the detection material or agent in accordance with the present invention.

FIG. 4 illustrates a method of applying the detection chemical material or agent to an existing structure. In the embodiment shown the detection chemical material or agent 40 is mixed with salt, sand, cinders, etc, which is normally applied to a road 42 by a truck 44. The detection chemical material or agent 40 can be encapsulated fluorescent dyes mixed with road salt, sand or cinders so when the salt, sand or cinders is applied to the road 42 the dyes would be spread over the road surface with the salt. If water soluble dyes were used, they would readily been spread with the salt. After the salt has been applied, the salt tends to congregate in cracks 27 as shown in FIG. 5 and so would the dye those emphasizing areas of road wear. Yellow-emitting halo phosphate phosphors are well established as sensors when used in this mode of operation.

FIG. 5 illustrates the uses of the detection chemical material or agent 40 to aid in detecting failures in the existing man-made object. An aerial platform 21 performs image capture 22 of a man-made structure (in this case a road 42) in the manner previously described. FIG. 5 also shows image capture of a road 42 with an isolated failure 24. In this instance, the detection of the failure is enhanced by the presence the chemical image contrast-enhancing detection chemical material or agent 40. The association of the detection chemical material or agent 40 with the failure 24 results in a more readily detectable physical/chemical change 24a.

Figure 6A:
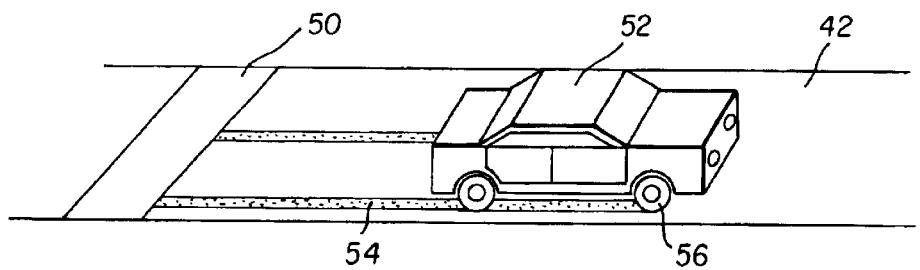
FIGS. 6a and 6b illustrates a method of applying and spreading the detection material or agent using a vehicle in accordance with the present invention.
Figure 6B:
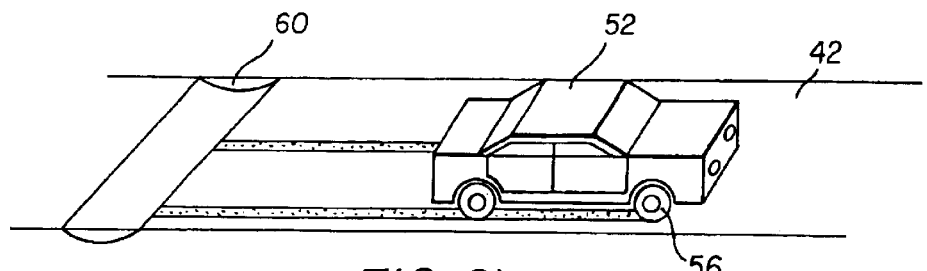
Figure 7:
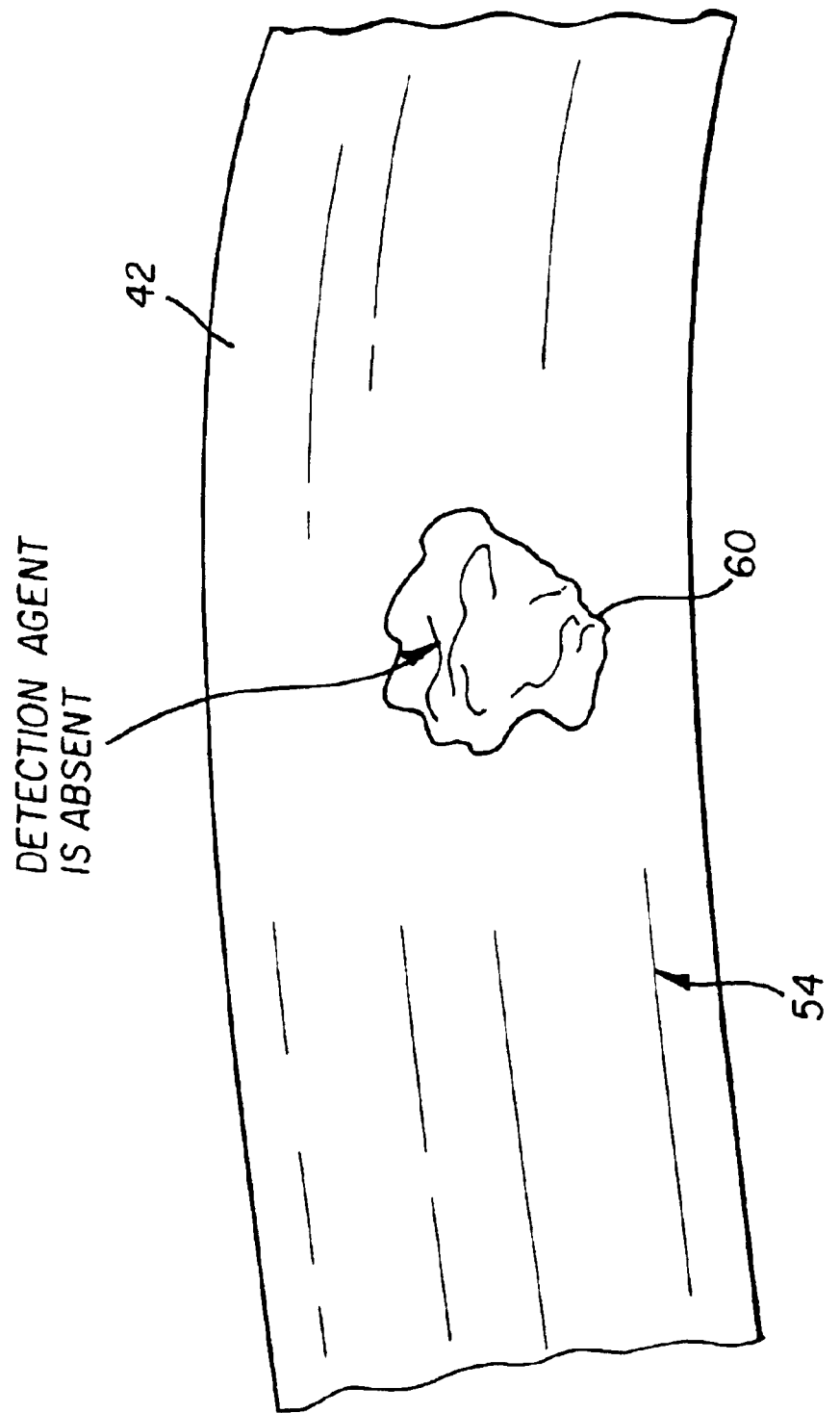
FIG. 7 illustrates a somewhat different embodiment of the present invention that uses the absence of a chemical material or agent to aid in detecting failure(s) in an existing man-made structure.

In another use scenario shown in FIG. 6a, the detection chemical material or agent 54 is incorporated into an existing man-made structure in a form of a tape 50 applied over the width of the road 42 where it becomes activated when a vehicle 52 drives over the tape 50. The detection chemical material or agent 54 would adhere to the tires 56 of the vehicle and be dispersed over the road's surface. Other delivery techniques are tire baths 58 as shown in FIG. 6b. For example, the tire bath 58 can be put at a toll plaza not shown. As the vehicle 52 stops to pay the toll the tires 56 pass through the tire bath 58 containing the detection chemical material or agent 54 which would then, be spread over the road 42 by the tires 56. In this embodiment the detection chemical material or agent 54 adheres to the road 42 surface in such as way that it does not accumulate in cracks 27 and potholes 60 as shown in FIG. 7. The failures 24, such as cracks 27 and potholes 60 become evident due to the absence of the detection chemical material or agent 54. Such detection chemical material or agents can include fluorescing compounds or compounds that enhance the reflectivity of the road surface in either the visible or infrared spectral regions. Moreover, the detection chemical material or agents 54 can be selected for use in the visible and invisible range of the spectrum. The detection chemical material or agents 54 can be a family of materials known as lanthanides, wherein the lanthanides are combined with halogen elements to form a detectable halide. Still further the detection chemical material or agents 54 can be selected to have cholesteric characteristics such that their orientation change based on thermal equilibrium with the surroundings and thereby exhibit a different color that can be detected by an appropriately selected sensor.

Figure 8:
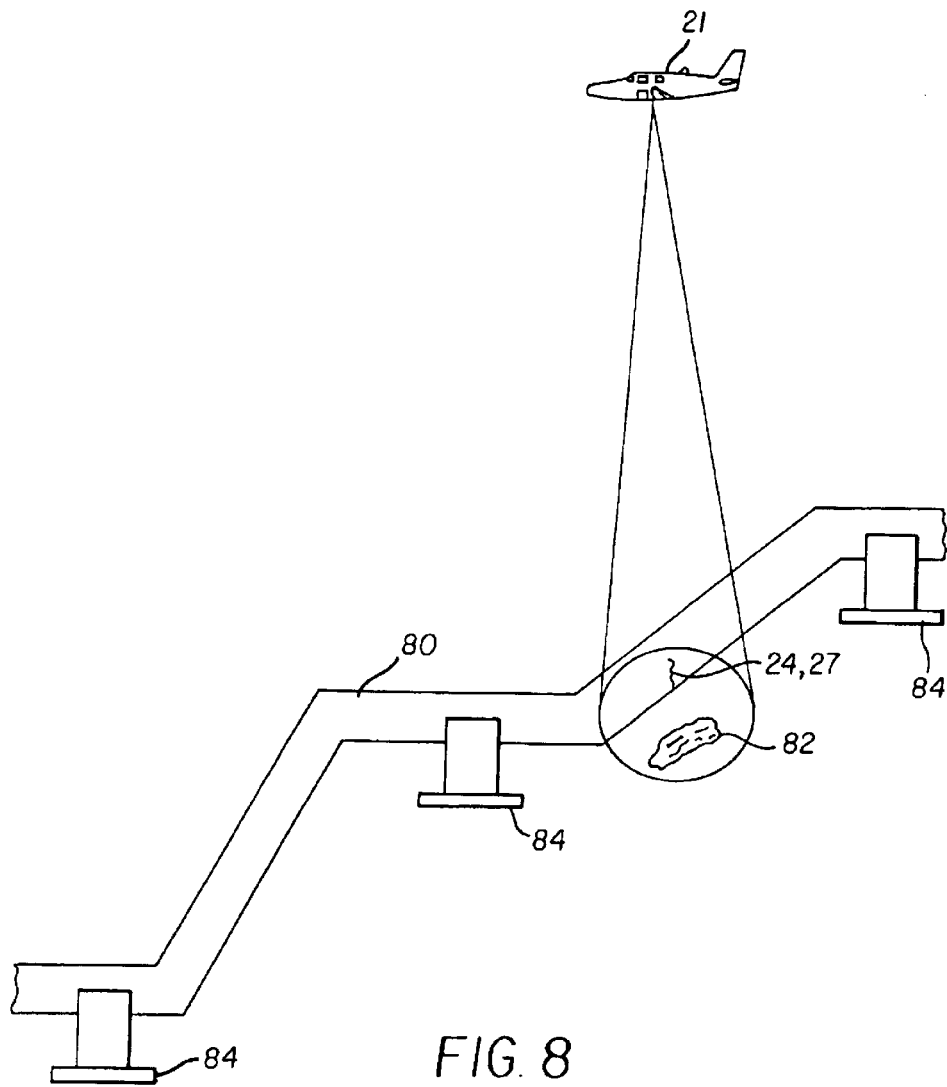
FIG. 8 illustrates another embodiment of the present invention that uses a chemical material or agent to aid in the detection of leaks in a pipeline.

In another embodiment of the present invention as illustrated in FIG. 8, the detection chemical material or agent 70 is added to the material flowing through a pipeline 80 held up by supports 84. The detection chemical material or agent 70 can be provided in a liquid or solid solution, but must be selected to be flowable in the pipeline 80. For example by adding the detection chemical material or agent 70 to the oil a failure 24 such as a crack 27, which causes a leak in or spill 82 from the pipeline 80, can easily be detected and recorded remotely. Small concentrations of oil soluble materials that fluoresce at visible wavelengths could significantly enhance the detection of an oil leak. The use of such materials is well known to those skilled in the art, and can be used singly or in combination, in remote sensing applications.

Such detection chemical material or agents 70 in combination with the optical filter 3 in FIG. 1 significantly improve the signal-to-noise ratio, and hence the detectability for remote sensing. The combination of the optical filter transmission function and the color-change to be detected as a result of a failure will be optimized for each application. This optimization methodology is well known to those skilled in the art.

The invention has been described in detail with particular reference to certain preferred embodiments thereof, but it will be understood that variations and modifications can be effected within the spirit and scope of the invention. For example, the control computer 31 can itself be reprogrammed from a remote location and would include all the necessary communication links to permit such reprogramming.

PARTS LIST 1 sensor system
2 capture device
3 optical filter
4 image capture control circuit
5 position and orientation control circuit
6 image storage
7 image processing circuit
8 capture device
9 capture scene data, time and position information
10 scene database
11 image analysis
12 further image analysis
13 communicate analysis results
14 scene 1
15 scene 2
16 orthorectification
17 illuminant correction
18 identify pixel changes
19 identify fault type
20 notification
21 aerial platform
22 capture
24 failure
24a detectable physical/chemical change
26 satellite
27 crack
28 ground based platform
31 control computer
40 detection chemical material or agent
42 road
44 truck
50 tape
52 vehicle
54 detection chemical material or agent
56 tires
58 tire bath
60 potholes
70 detection chemical material or agent
80 pipeline
82 spill
84 supports

What is claimed is:

1. A method for capturing at least one image of an existing man-made structure and for detecting the presence of failure (s) in such existing man-made structures comprising:

(a) separately providing a detectable material on a surface so that portions of the detectable material will be present in the failure(s) of the existing man-made structure that accentuates the failure, wherein the detectable material is separately applied, after forming the surface as a man-made structure;

(b) providing an image sensor which captures at least one image of the existing man-made structure and identifies failure(s) due to the existence of the detectable material in the failure(s) to provide at least one digital image; and (c) processing the captured digital image(s) to provide a visual image of the existing man-made structure to determine the presence of failure(s) in the existing man-made structure;

wherein the digital image(s) is captured by a capture device which is located in an aircraft or satellite.

2. The method of claim 1 wherein the digital image processing includes comparing previously captured digital images with newly captured digital image(s) to determine variations in the captured digital image(s) at predetermined coordinates which indicate a potential failure in the existing man-made structure.

3. The method of claim 2 wherein the image processing includes storing in memory a representation of different failures to be detected and comparing the captured digital image with the failures to determine the presence of a failure, and location of such failure.

4. The method of claim 1 wherein the detectable material interacts with incident radiation emitted from an aircraft or satellite to cause radiation from the failure in the existing man-made structure to be detected by the image sensor.

5. The method of claim 4 wherein the detectable material includes encapsulated dyes or phosphors.

6. The method of claim 4 wherein the detectable material is included in a liquid solution or solid solution which Is distributed on the failure in the existing man-made structure.

7. The method of claim 4 wherein the detectable material is a lanthanide, and wherein the lanthanide is combined with halogen elements to form a detectable halide.

8. The method in claim 4 wherein the detectable material includes cholesteric characteristics that change their orientation based on thermal equilibrium with the surroundings and exhibit a different color that can be detected by the image sensor.

9. The method of claim 1 wherein step (a) includes (i) forming the surface at a fixed location, and (ii) applying the detectable material, after forming the surface at the fixed location.

10. The method of claim 1 wherein the detectable material is separately provided on a road surface.

* * * * *